United States Patent
Gillihan et al.

(10) Patent No.: US 7,126,703 B1
(45) Date of Patent: Oct. 24, 2006

(54) PRINTER CONTROLLER WITH ERROR RECOVERY FOR MULTIPLE LANGUAGE CAPABILITY

(75) Inventors: Thomas M. Gillihan, Portland, OR (US); Larry Alan Westerman, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 944 days.

(21) Appl. No.: 09/128,580

(22) Filed: Aug. 4, 1998

(51) Int. Cl.
*G06F 15/00* (2006.01)

(52) U.S. Cl. .................................... 358/1.14; 358/1.15
(58) Field of Classification Search ............... 358/1.13, 358/1.14, 1.15, 1.1, 407, 468; 395/500.44, 395/500.45, 500.46, 500.47, 500.48, 500.49
See application file for complete search history.

(56) References Cited

U.S. PATENT DOCUMENTS

| | | | |
|---|---|---|---|
| 4,651,278 A | 3/1987 | Herzog et al. .............. 364/300 |
| 4,965,771 A | 10/1990 | Morikawa et al. .......... 364/900 |
| 4,968,159 A | 11/1990 | Sasaki et al. ................ 400/76 |
| 5,036,476 A | 7/1991 | Yamaguchi et al. ........ 364/519 |
| 5,075,874 A * | 12/1991 | Steeves et al. ............. 358/1.13 |
| 5,165,014 A | 11/1992 | Vassar ....................... 395/112 |
| 5,222,200 A * | 6/1993 | Callister et al. ........... 358/1.13 |
| 5,226,112 A | 7/1993 | Mensing et al. ............ 395/114 |
| 5,228,118 A | 7/1993 | Sasaki ....................... 395/112 |
| 5,293,466 A * | 3/1994 | Bringmann ................ 358/1.15 |
| 5,303,336 A | 4/1994 | Kageyama et al. ......... 395/114 |
| 5,392,419 A * | 2/1995 | Walton ...................... 358/1.13 |
| 5,402,527 A | 3/1995 | Bigby et al. ................ 395/101 |
| 5,475,801 A | 12/1995 | Brindle et al. ............. 395/114 |
| 5,555,435 A * | 9/1996 | Campbell et al. .......... 358/1.13 |
| 5,592,683 A | 1/1997 | Chen et al. ................. 395/872 |
| 5,715,379 A * | 2/1998 | Pavlovic et al. ........... 358/1.13 |
| 5,828,817 A * | 10/1998 | Landau ...................... 358/1.13 |
| 5,852,709 A * | 12/1998 | Watanabe .................. 358/1.13 |
| 5,854,940 A * | 12/1998 | Niihara et al. ............. 358/1.13 |

* cited by examiner

*Primary Examiner*—Gabriel Garcia
(74) *Attorney, Agent, or Firm*—Chernoff, Vilhauer, McClung & Stenzel

(57) ABSTRACT

A system for error recovery when printing documents has multiple printer description language formats. In particular, a document to be printed on a printer is received. The document is then examined to select one of a plurality of parsers suitable to parse the printer description language of the document. In response to examining the document to determine its format, the document is processed by selecting at least one of a first printer description language and a second printer description language for parsing the document. The remainder of the document is examined for synchronization data while the document is parsed.

9 Claims, 6 Drawing Sheets

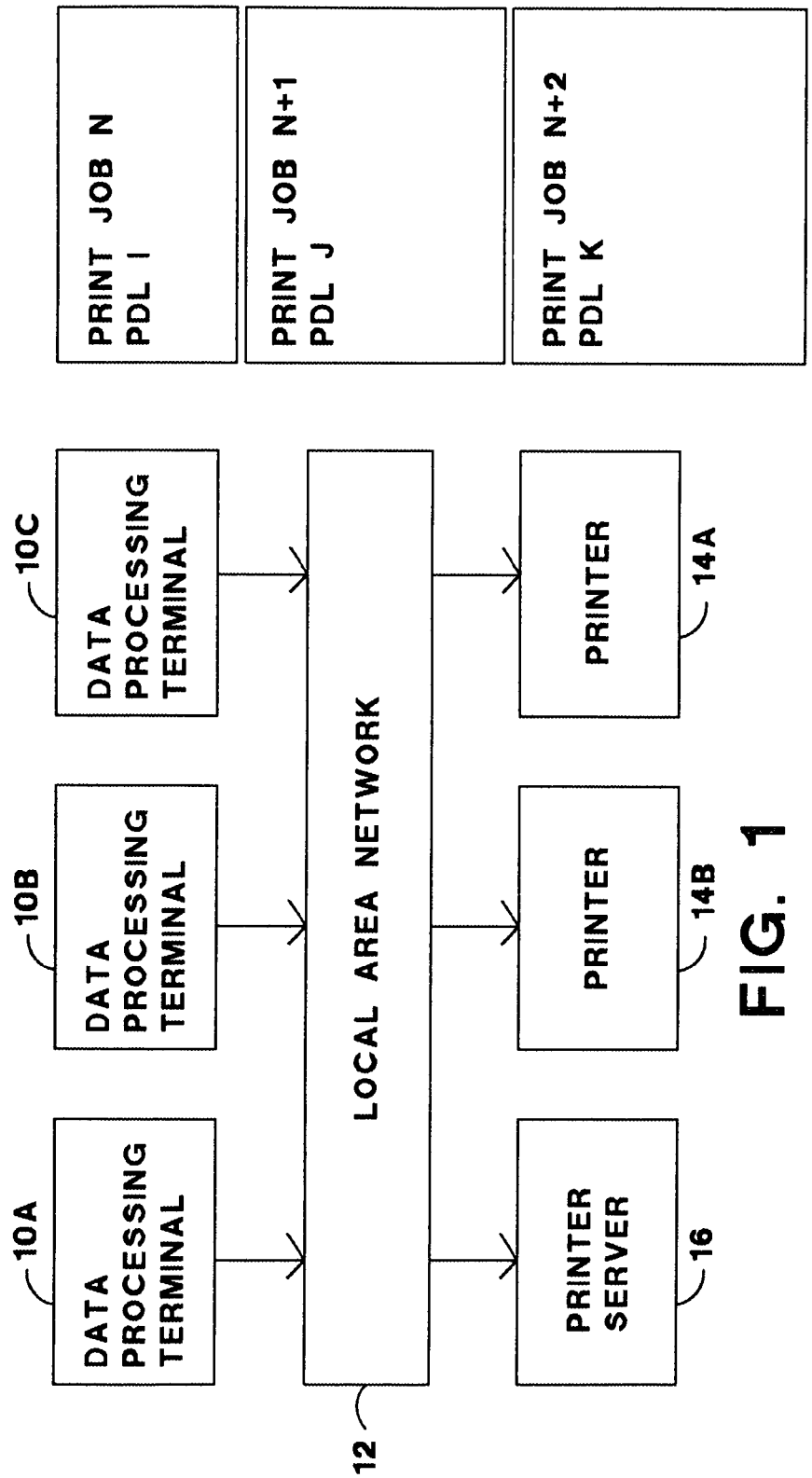

| PDL DETERMINATION | POINTER | PDL PARSER | POINTER | DATA BUFFER CONTENTS |
|---|---|---|---|---|
| INITIALIZED JOB N<br>PDL I FOUND | 100<br>100 | | | 100 JOB N<br>PDL I |
| | | PDL I INITIALIZED<br>(PROCESSING)<br>END OF PAGE | 100<br>101 | |
| ACKNOWLEDGE<br>BUFFER POINTER RESET | 101 | | | 101 END OF PAGE 1<br>END OF JOB |
| | | END OF JOB N | 102 | |
| ACKNOWLEDGE<br>BUFFER POINTER RESET<br>---END OF JOB N---<br>INITIALIZE JOB N+1<br>PDL J FOUND | 102<br>102<br>102 | | | 102 JOB N+1<br>PDL J |
| | | PDL J INITIALIZED<br>(PROCESSING)<br>END OF PAGE 1 | 102<br>103 | |
| ACKNOWLEDGE<br>BUFFER POINTER RESET | 103 | | | 103 END OF PAGE 1 |
| | | (PROCESSING)<br>END OF PAGE 2 | 103<br>104 | |
| ACKNOWLEDGE<br>BUFFER POINTER RESET | 104 | | | 104 END OF PAGE 2 |
| | | (PROCESSING)<br>ERROR DETECT | 104<br>106 | |
| ACKNOWLEDGE<br>REINITIALIZE<br>PDL K FOUND | 104<br>105 | | | 105 <ERROR> |
| | | PDL K INITIALIZED<br>(PROCESSING)<br>END OF PAGE 1 | 105<br>107 | 105 JOB N+2<br>106 PDL K<br><ERROR DETECTED><br>107 END OF PAGE 1<br>END OF JOB |
| ACKNOWLEDGE<br>BUFFER POINTER RESET | 106 | | | |

FIG. 7

PRINTER CONTROLLER WITH ERROR RECOVERY FOR MULTIPLE LANGUAGE CAPABILITY

BACKGROUND OF THE INVENTION

The present invention relates to a print engine that includes error recovery, and in particular to a print engine with multiple language capability that includes error recovery.

Personal computers have become commonplace on the desks of most office workers. Typically, much of the work product of such computers is intended to be transformed into hard copy using a printer having digital imaging technology. A typical printer configuration for this purpose is a printer dedicated to each personal computer. However, dedicated printers are typically inexpensive laser printers which have limited functions and features, such as a limited tray capacity and no finishing capability. More importantly, inexpensive laser printers typically handle only one page description language.

Expensive high speed laser printers normally have flexible finishing and copy sheet capability which allows for example, custom printing and finishing of work product. Such a laser printer would be highly desirable for each personal computer, but is cost prohibitive. In practice, personal computers are frequently networked together which permits a single printer to be used simultaneously by a plurality of different clients, such as personal computers or the like.

Referring to FIG. 1, data processing terminals 10a, 10b and 10c, such as personal computers, transmit electronic print documents through a local area network (LAN) 12 to a selected printer 14a or 14b for printing. In particular, the LAN 12 provides a medium by which different terminals are able to share resources such as printers 14a, 14b, file servers, a printer server(s) 16, and scanners. Integration of shared resources has been addressed by LAN managers using different network protocols, such as Ethernet and Token Ring, to make different devices running different network-protocols transparent to the terminals. Most printer servers 16 and many printers 14a, 14b support a variety of print drivers using different page description languages (PDLs).

A PDL is a method of describing a printed page(s) in a printer independent format. No single standard PDL presently exists, and as a result a number of industry standards have emerged. A PDL establishes an interface between a print driver or client (terminal or personal computer), and a printer server or printer. Several currently existing PDLs include PostScript (PS), Hewlett Packard Printer Control Language (HP-PCL), and Interpress Page Description Language.

In existing systems, the processing of the PDL data takes place using an interpreter, which reads the received PDL data (typically text) and creates corresponding bit mapped data which is provided to the printer engine. The printer engine transforms received digital data into areas of black or colored ink on the paper or other medium fed into the printer.

In networked systems, in which several users at various terminals are sharing a single printer, a desirable feature is that each terminal (i.e., each user) will "see" the network accessible printer as "dedicated" to that user. In other words, when a user transmits a document to be printed on the central printer, the user desires the same service as if the printer was dedicated to that terminal. In fact, most printer interfaces used on personal computers are designed to operate in a fashion that appears to the user as a one-to-one relationship between the terminal and the printer. A user does not want to observe any delays caused by an undesirable interaction of his print job with another job from a different user to be printed on the central networked printer at generally the same time. Further, an important customer requirement is that the networked printer is capable of receiving document data in a variety of different PDLs. As mentioned above, two common types of PDLs are PostScript and HP-PCL.

Many printers (or print servers) incorporate a plurality of language interpreters to facilitate printing documents that are transmitted to the printer in a variety of PDL formats. In such a printing system, one of several PDL interpreters within the printer (or print server) is automatically selected depending upon the PDL format of the print data from a particular data processing device. Accordingly, the appropriate language interpreter must be selected for each print job. There are numerous patents describing printer controllers which include multiple interpreters, such as, U.S. Pat. No. 4,651,278; U.S. Pat. No. 4,965,771; U.S. Pat. No. 4,968,159; U.S. Pat. No. 5,036,476; U.S. Pat. No. 5,165,014; U.S. Pat. No. 5,226,112; U.S. Pat. No. 5,228,118; U.S. Pat. No. 5,303,336; U.S. Pat. No. 5,402,527; U.S. Pat. No. 5,475,801; and U.S. Pat. No. 5,592,683, all of which are incorporated herein by reference.

In an ideal situation the transmission and processing of printer data is error-free. As such, all of the print jobs will likely print properly. Unfortunately, errors periodically occur in the data transmitted from the terminal to the printer, data is lost or corrupted within the printer itself, protocol failures mix different data streams at the printer server or in the printer, and errors originate within the client or printer software. For example, if PostScript data is being transmitted to the printer and an error occurs, then the printer may interpret the data as standard text which likely results in printing an extensive number of pages containing "garbled" data.

Printer description languages typically include synchronization and setup data at the beginning, and at intermediate locations, within each document. When errors occur within a document, either a portion of the page will be corrupted while the remainder of the document prints properly, or the printer will become sufficiently confused and continue printing at the next synchronization point. Unfortunately, the next synchronization point for many documents is not until the next document, which results in the loss of the remainder of the current document. This technique of error recovery is typically used in printers that support only one PDL.

For printers that support multiple language interpreters it has been observed that frequently when an error occurs in a first document, the remainder of the document is lost in a manner similar to printers with a single language interpreter. Unfortunately, the next document is frequently likewise lost resulting in additional frustration to users.

Alternatively, the printer may request the retransmission of all or part of the PDL stream in which an error is found. However, retransmission requires a two-way communication between the printer and the originating producer of the PDL data which is typically not available in heterogeneous distributed networking environments.

What is desired, therefore, is an error recovery system for a print engine that does not result in the loss of the next document following an error.

SUMMARY OF THE PRESENT INVENTION

The present invention overcomes the aforementioned drawbacks of the prior art by providing a system for error recovery when printing documents having multiple printer description language formats. In particular, a document to be printed on a printer is received. The document is then examined to select one of a plurality of parsers suitable to parse the printer description language of the document. In response to examining the document to determine its format, the document is processed by selecting at least one of a first printer description language and a second printer description language for parsing the document. The remainder of the document is examined for synchronization data while the document is parsed.

By examining the document for synchronization data while parsing the document for printing the improved printing system does not result in the loss of subsequent documents when the synchronization data is inadvertently processed as data of a different printer description language. Preferably the system uses pointers and a buffer to permit the resetting of the page description language parsing process to the appropriate data stored within the buffer upon the detection of an error, such as when the end of document control codes in the document includes an error or is missing. For multi-stage printers that include multiple documents in the printing que which require printing, collating, and stapling, the avoidance of any preventable errors is extremely important. In the event of an unrecoverable error, it is time consuming and expensive to restart the job and clear the printer, collator, and stapler of the improperly processed job.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 1 is block diagram of a printing system including data processing terminals, local area network, printer server, and printers.

FIG. 2 is an illustration of document flow within a printer.

FIG. 7 is an illustration of the process sequence of document flow within a printer including a page description language determination, a page description language parser, pointers, and data buffer contents.

DETAILED DESCRIPTION OF THE PREFERRED EMBODIMENT

Referring to FIG. 2, printers may incorporate multiple language interpreters i, j, and k, multiple print jobs n, n+1, and n+2, each of which may have a different PDL i, j, and k, that are concatenated on a communication channel by virtue of the printer server or directly under the control of intercommunication between the printer and the individual data processing terminals 10a–10c. Print jobs are generated asynchronously, and thus may arrive at the printer in any temporal relationship. Current printers generally incorporate a mechanism for arbitrating among network clients, and a given printer will communicate with one and only one data processing terminal or server until the entirety of a print job has been received and placed into an internal queue (or processed in its entirety) before engaging in negotiation with another terminal or server to receive a subsequent print job. Many printers contain sufficient memory and/or storage to hold multiple pending print jobs while a current job is being interpreted and printed. Therefore, it is clear that the communication channel between the printer and the originator of a print job data stream may have been terminated before the contents of the data stream are parsed and processed.

Figure 3:
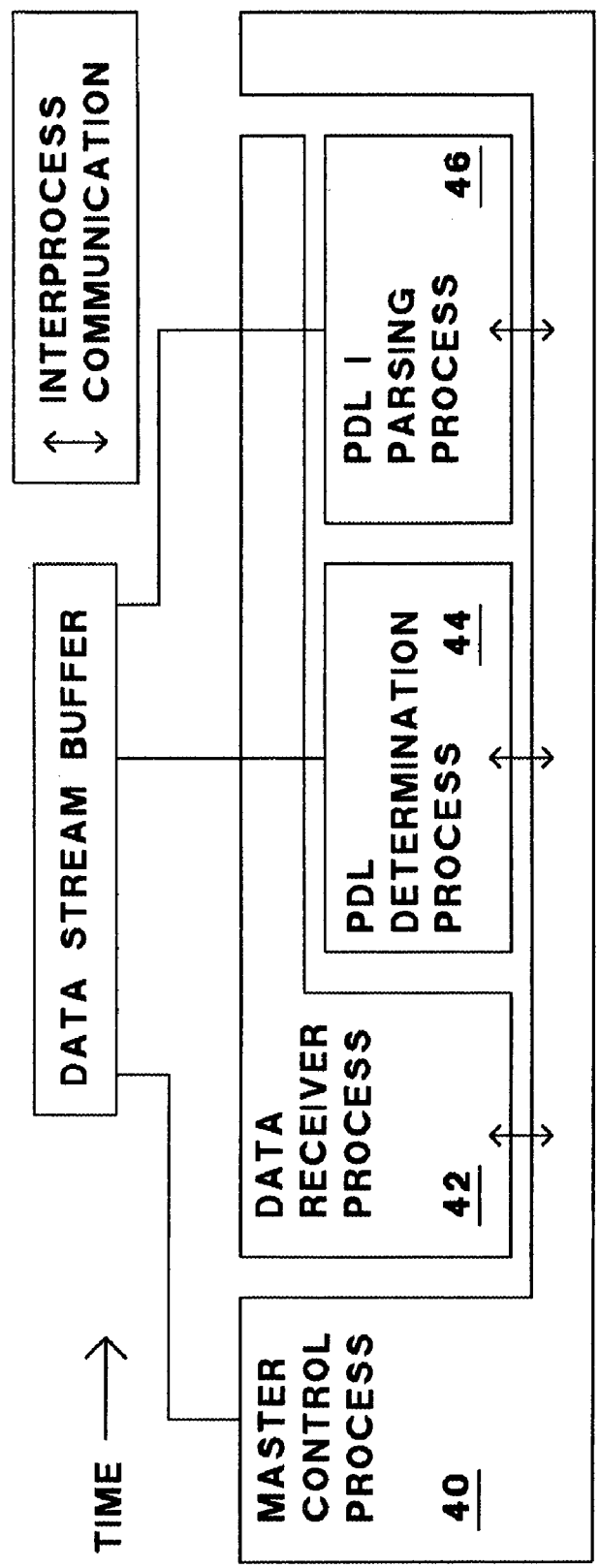
FIG. 3 is a block diagram of the temporal processes within current printer systems.

Referring to FIG. 3, typical processing elements within a printer include a series of processes and steps that are executed in a particular predefined manner. When there are no prior documents in the print queue of the printer, a new document data stream is received by the master control process 40 which manages the hardware of the printer and the different document flows through the printer. As such, the master control process 40 receives and responds to internal and external data sensor input, as well as managing the initiation and termination of other subprocesses within the printer. After receipt of a document, the master control process 40 initiates a data receiver process 42 which manages communication within the local area network, reads the data stream from a print job, and stores data in an internal data buffer. Next, a printer description language (PDL) determination process 44 examines the current contents of the data buffer, and determines the particular PDL of the initial portion of the data buffer contents. This process permits the identification of the particular PDL language encoding of the document. The data receiver process 42 may terminate prior to the completion of the PDL determination process 44 or may continue concurrently with the process, depending on the characteristics of the printer and the state of network print job requests. Once the determination is made as to which PDL language the document is encoded in, the PDL determination process 44 is terminated because the remainder of the document is always encoded using the same technique. Then control is passed to the PDL parsing process 46, which reads data from the buffer and creates the corresponding output bitmap which is then transformed into the printed page(s).

With such a printing process, it has been accepted that if an error occurs that the PDL parsing process 46 is unable to recover from, then the PDL parsing process 46 will terminate and notify the master control process 40 of the error. The master control process 40 then starts both the data receiver process 42, if deactivated, and starts the PDL determination process 44 to search for the next synchronization point. The next synchronization point in many cases is the following document. Also, several pages of "garbage" will likely print upon the occurrence of an error. Moreover, the next document is frequently lost resulting in additional user frustration.

Figure 4:
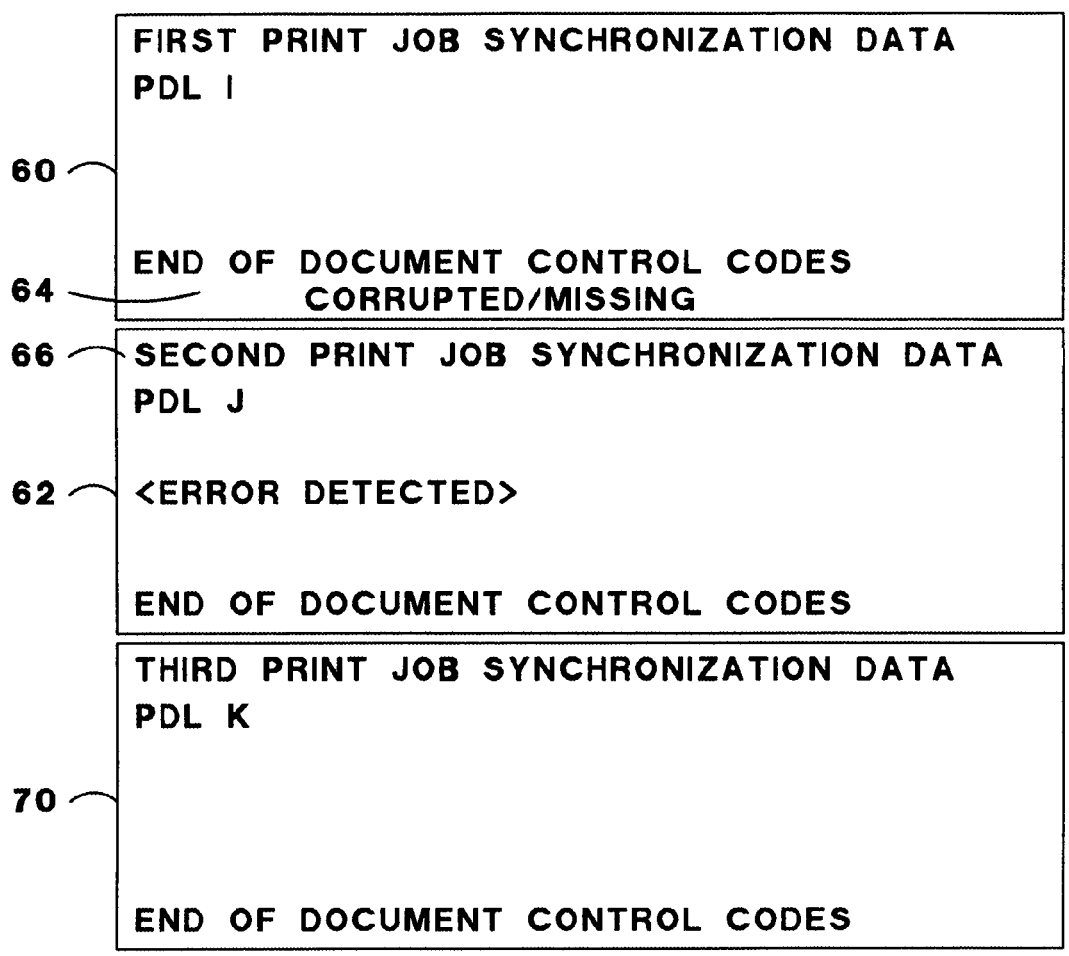
FIG. 4 is an illustration of document flow within a printer including an error therein.

Referring to FIG. 4, the present inventors came to the realization that the principal reason that the printing process periodically discards the second document 62 after an error occurs in the first document 60 is that the end of document control codes 64 in the first document include an error or are missing. Without the end of document control codes 64, the PDL parsing process 46 attempts to parse the synchronization data 66 of the second document 62 as if it were data of the previous document. In such an event, several lines of synchronization data 66 of the second document 62 are processed before the PDL parsing process 46 determines that an error has occurred. The PDL parsing process 46 then notifies the master control process 40 of the error which then reinitializes the data receiver process 42 and the PDL determination process 44. The PDL determination process then looks for the next synchronization point. Normally, this results in waiting until a third document 70 because the synchronization data 66 of the second document 62 has already been inappropriately processed as data by the PDL parsing process 46. Periodically, while searching for synchronization data, the PDL determination process 44 locates data within the second document 62 that matches another printer description language. The PDL parsing process 46 will then attempt to process the remaining second document 62 with the matched printer description language, which may not be the proper printer description language for the second document 62, resulting in many pages of "garbage."

Figure 5:
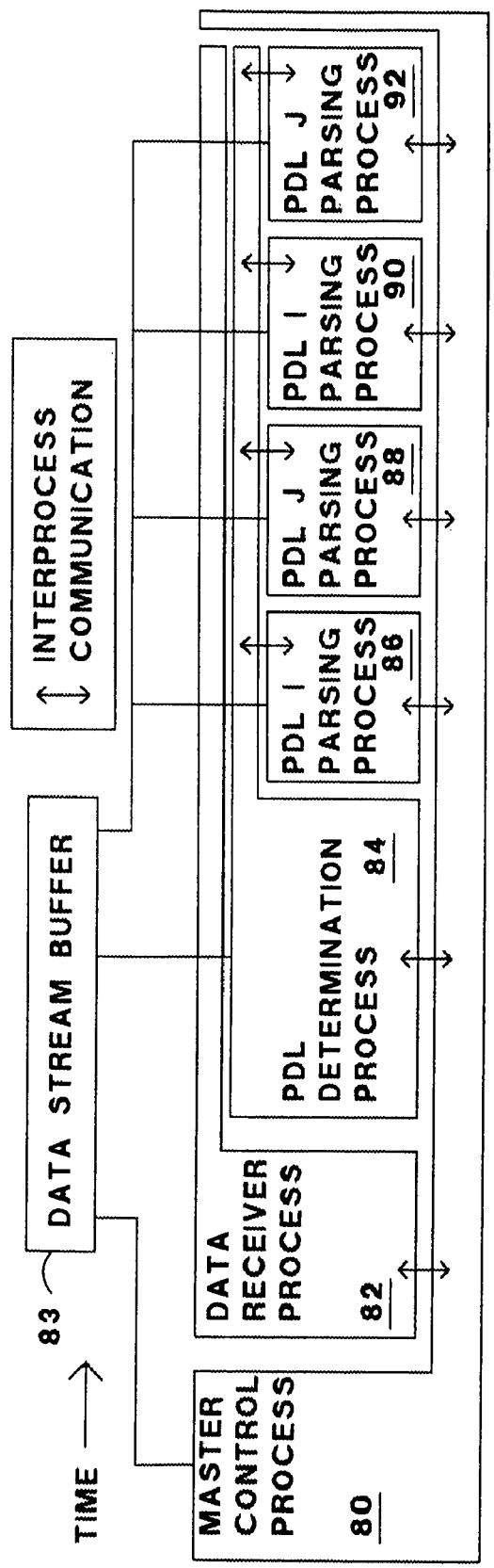
FIG. 5 is a block diagram of an exemplary embodiment of the temporal processes within a printer system of the present invention.

With the aforementioned realization of the reason why the printing process periodically discards the second document 62 after an error occurs in the first document 60, the present inventors developed an improved printing system to overcome this limitation. Referring to FIG. 5, the master control process 80 initiates the data receiver process 82, and when sufficient data is present in the data stream buffer 83, the PDL determination process 84 is initiated to determine the PDL of the data stream. However, once the PDL is identified and the appropriate PDL paring process 86, 88, 90, or 92 is initiated, the PDL determination process 84 continues to execute, reading characters from the data stream buffer 83 and determining potential points at which the PDL may have changed. As segments of the data stream are processed (for example, at the end of each page), the selected PDL parsing process 86, 88, 90 or 92 sends a signal to the PDL determination process 84 to advance its pointer in a data buffer to the most recent data byte which has been parsed with no ambiguity.

Figure 6:
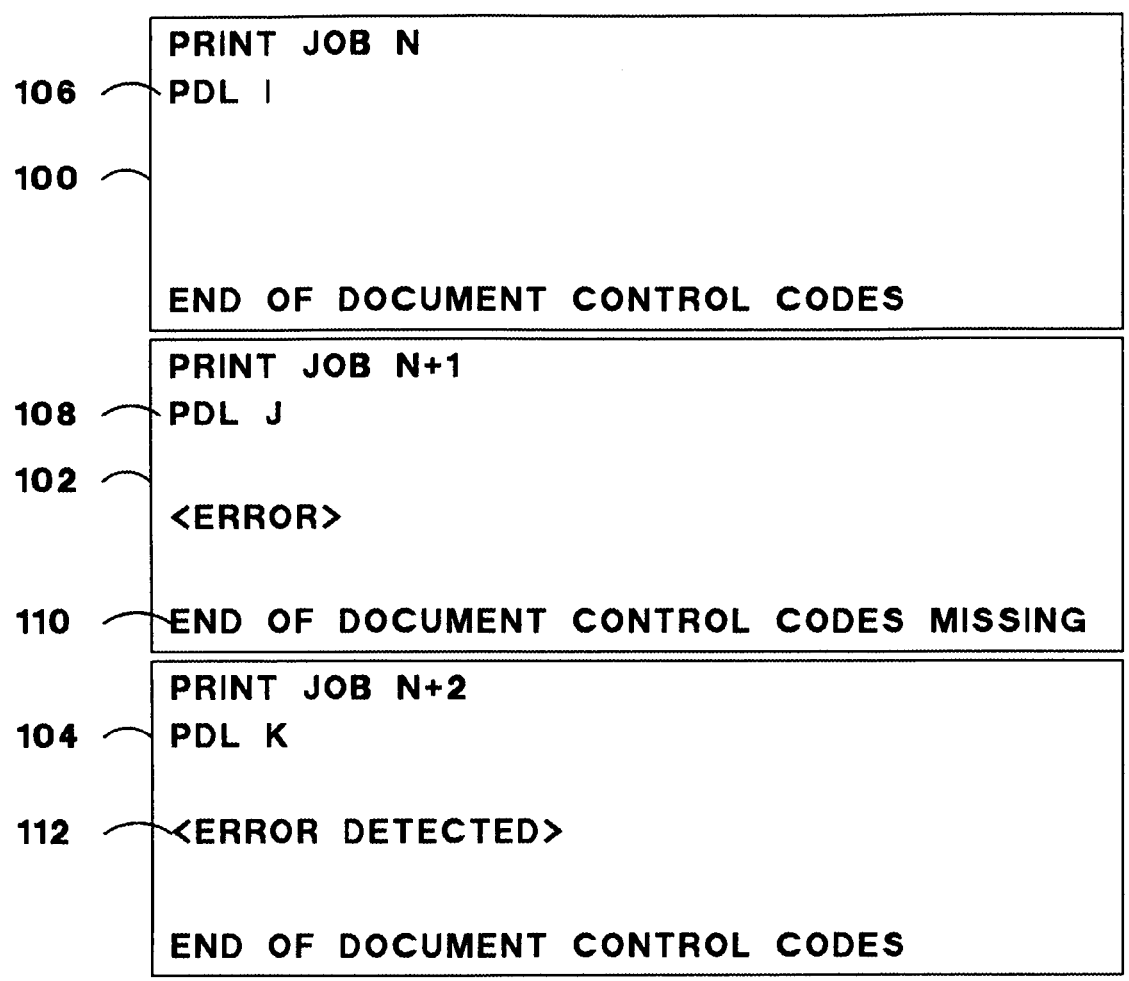
FIG. 6 is another illustration of document flow within a printer including an error therein.

Referring to FIG. 6, if three data streams n 100, n+1 102 and 104 n+2 are received in sequence by the data receiver process 82, prior to the completion of processing of the first data stream 100, the data streams are stored in the data buffer. To illustrate the improved technique, assume that an error exists in data stream n+1 102. As data stream n 100 is processed, the PDL determination process 84 recognizes that data stream n 100 as consisting of PDL i commands 106 and accordingly the PDL i parsing process 86 is activated. When job n 100 is finished without error, the PDL determination process 84 is reinitialized and will proceed to analyze data stream n+1 102 and recognizing it as consisting of PDL j commands 108. The PDL j parsing process 88 will be activated. As segments of job n+1 102 are completed, the data buffer corresponding to the PDL determination process 84 is advanced in stages, and the PDL determination process 84 continues to evaluate the buffer contents to determine the PDL language of the contents starting at each intermediate point. When erroneous data is detected 112 in data stream n+2 104 (such as missing or corrupted end of document control codes 110), the PDL parsing process 88 exits with an error condition and the PDL determination process 84 immediately determines the most probable language corresponding to the buffer contents at the last prior intermediate point signaled by the PDL parsing process 88. In this example, the PDL determination process 84 requires the presence of an appropriate preamble or header for a valid data stream prior to signaling recognition of the PDL, after which the corresponding PDL parsing process 86, 88, 90, and 92 is acti-vated. A buffer pointer corresponding to the position in the buffer where the PDL determination process 84 found an appropriate preamble or header may be prior to the position at which the previous PDL parsing process 88 found the error. In this example, the buffer pointer is reset to the start of data stream 104 and the PDL determination process 84 actuates PDL parsing process 90 for PDL k. The result is proper printing of data stream n+2 104.

Referring to FIG. 7, the temporal sequence of operations illustrates that the PDL parsing operation stays active, while keeping track of a position in the data buffer at which the identify of the PDL of the corresponding data was relatively certain. When an error is encountered, the PDL determination process can reestablish the identify of the PDL stream in the buffer starting from the prior acknowledgment point, and prevent the loss of a complete job from the data stream. Conventional processing for the documents of FIG. 7 would have resulted in the loss of document n+2. Under the improved processing document n+2 is not lost because the error is detected and the parser is reset to the beginning of document n+2 from the buffer.

Accordingly, the improved printing process does not result in the loss of subsequent documents when the synchronization data is inadvertently processed as data of a different printer description language. The use of pointers and the buffer permits the resetting of the PDL parsing process to the appropriate data stored within the buffer upon the detection of an error, such as when the end of document control codes in the document includes an error or is missing. For multi-stage printers that include multiple documents in the printing que which require printing, collating, and stapling, the avoidance of any preventable errors is extremely important. In the event of an unrecoverable error, it is time consuming and expensive to restart the job and clear the printer, collator, and stapler of the improperly processed job.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A method of printing documents comprising the steps of:
 (a) receiving a document to be printed on a printer;
 (b) examining said document to select one of a plurality of parsers suitable to parse the printer description language of said document;
 (c) in response to step (b) processing said document by selecting at least one of a first printer description language and a second printer description language and parsing said document using said at least one of said first and said second printer description languages; and
 (d) said examining of step (b) continuing to examine said document for synchronization data while said parsing of step (c).

2. The print engine of claim 1 wherein said receiving of step (a) is a data receiver process.

3. The print engine of claim 1 wherein said examining said document of step (b) is a printer description language determination process.

4. The print engine of claim 1 wherein said processing of step (c) are printer description language parsing processes for different printer description languages.

5. The print engine of claim 1, further comprising the step of providing a master control process that receives and responds to internal and external data sensor input.

6. The printer engine of claim 1 wherein said first printer description language is selected from the group of HP-PCL, PostScript, and Interpress Page Description Language.

7. The printer engine of claim 1, further comprising the steps of:
   (a) receiving a plurality of documents; and
   (b) examining each of said plurality of documents to select which printer description language is suitable to parse the printer description language of each of said respective documents.

8. The printer engine of claim 7, further comprising the steps of:
   (a) examining said plurality of documents for synchronization data; and
   (b) examining said documents for said synchronization data while said processing said document by said selecting said at least one of said first printer description language and said second printer description language.

9. The printer engine of claim 8, further comprising the steps of:
   (a) detecting an error within one of said documents; and
   (b) initializing a different one of said selected said at least one of a first printer description language and said second printer description language.

* * * * *

UNITED STATES PATENT AND TRADEMARK OFFICE
CERTIFICATE OF CORRECTION

PATENT NO. : 7,126,703 B1  Page 1 of 1
APPLICATION NO. : 09/128580
DATED : October 24, 2006
INVENTOR(S) : Thomas M. Gillihan and Larry Alan Westerman It is certified that error appears in the above-identified patent and that said Letters Patent is hereby corrected as shown below:

Column 5, line 29 - change "paring" to --parsing--

Signed and Sealed this

Eighteenth Day of March, 2008

JON W. DUDAS
*Director of the United States Patent and Trademark Office*